United States Patent
Wong (10) Patent No.: US 12,511,763 B2
(45) Date of Patent: Dec. 30, 2025

(54) COORDINATE SYSTEM OFFSET CALCULATING APPARATUS, METHOD, AND NON-TRANSITORY COMPUTER READABLE STORAGE MEDIUM THEREOF

(71) Applicant: HTC Corporation, Taoyuan (TW)

(72) Inventor: Shang-I Wong, Taoyuan (TW)

(73) Assignee: HTC Corporation, Taoyuan (TW)

( * ) Notice: Subject to any disclaimer, the term of this patent is extended or adjusted under 35 U.S.C. 154(b) by 174 days.

(21) Appl. No.: 18/476,334

(22) Filed: Sep. 28, 2023

(65) Prior Publication Data
US 2025/0111522 A1   Apr. 3, 2025

(51) Int. Cl.
G06T 7/246 (2017.01)
G06T 7/00 (2017.01)
G06T 7/60 (2017.01)
G06T 19/00 (2011.01)

(52) U.S. Cl.
CPC ............... *G06T 7/248* (2017.01); *G06T 7/60* (2013.01); *G06T 7/97* (2017.01); *G06T 19/00* (2013.01)

(58) Field of Classification Search
CPC .. G06T 7/248; G06T 7/60; G06T 7/97; G06T 19/00; G06T 7/80; G06F 3/0346; G06F 3/011
See application file for complete search history.

(56) References Cited

U.S. PATENT DOCUMENTS

| | | | | |
|---|---|---|---|---|
| 5,471,226 A | * | 11/1995 | Suzuki | G06F 3/0418 345/173 |
| 6,366,866 B1 | * | 4/2002 | Kanagawa | G06F 3/04182 73/1.79 |
| 6,753,828 B2 | * | 6/2004 | Tuceryan | H04N 13/373 345/157 |
| 6,809,726 B2 | * | 10/2004 | Kavanagh | G06F 3/0418 345/173 |

(Continued)

FOREIGN PATENT DOCUMENTS

| | | |
|---|---|---|
| CN | 106415447 B | 8/2019 |
| CN | 108733206 B | 10/2020 |

(Continued)

OTHER PUBLICATIONS

The office action of the corresponding Taiwanese application No. TW113104266 issued on Aug. 19, 2024.

*Primary Examiner* — Motilewa Good-Johnson
(74) *Attorney, Agent, or Firm* — CKC & Partners Co., LLC (57) ABSTRACT

A coordinate system offset calculating apparatus, method, and non-transitory computer readable storage medium thereof are provided. The apparatus generates at least two virtual calibration coordinates, and the at least two virtual calibration coordinates correspond to a first coordinate system. The apparatus receives at least two sensing coordinates from a tracking apparatus in response to the tracking apparatus moving to the at least two virtual calibration coordinates, the at least two sensing coordinates are generated by (Continued)

the tracking apparatus, and the at least two sensing coordinates correspond to a second coordinate system. The apparatus calculates a coordinate system offset corresponding to the first coordinate system and the second coordinate system based on the at least two virtual calibration coordinates and the at least two sensing coordinates.

20 Claims, 7 Drawing Sheets

(56) References Cited

U.S. PATENT DOCUMENTS

| | | | | |
|---|---|---|---|---|
| 7,301,648 | B2* | 11/2007 | Foxlin | G02B 27/017 356/620 |
| 7,542,040 | B2* | 6/2009 | Templeman | G06T 13/40 345/474 |
| 8,854,433 | B1* | 10/2014 | Rafii | G06F 3/011 348/42 |
| 10,146,335 | B2* | 12/2018 | Balan | H04N 13/344 |
| 10,503,247 | B2* | 12/2019 | Samples | G06F 3/012 |
| 10,535,199 | B1* | 1/2020 | Bond | G06T 15/08 |
| 10,592,048 | B2* | 3/2020 | Li | G02B 27/017 |
| 10,671,160 | B2* | 6/2020 | Uscinski | G06V 20/20 |
| 10,796,493 | B2* | 10/2020 | Kim | G06F 3/011 |
| 10,802,606 | B2* | 10/2020 | Huang | G06F 3/01 |
| 11,127,193 | B2* | 9/2021 | Segal | G06T 7/70 |
| 11,314,321 | B2* | 4/2022 | Steedly | A63F 13/42 |
| 11,454,811 | B2 | 9/2022 | Xiao et al. | |
| 11,625,090 | B2* | 4/2023 | Nienstedt | G06F 3/0325 345/156 |
| 11,756,259 | B2* | 9/2023 | Iwase | G06F 3/012 345/419 |
| 12,125,233 | B2* | 10/2024 | Xu | G06T 7/70 |
| 2002/0113756 | A1* | 8/2002 | Tuceryan | G02B 27/017 348/E13.052 |
| 2008/0228422 | A1* | 9/2008 | Satoh | G06F 3/038 702/92 |
| 2011/0009241 | A1* | 1/2011 | Lane | G06F 3/011 482/8 |
| 2017/0083084 | A1* | 3/2017 | Tatsuta | G06F 3/147 |
| 2017/0154471 | A1* | 6/2017 | Woo | G06F 3/011 |
| 2017/0192496 | A1* | 7/2017 | Balslev | A63F 13/213 |
| 2018/0348861 | A1* | 12/2018 | Uscinski | A63F 13/211 |
| 2019/0138114 | A1* | 5/2019 | Huang | G06F 3/012 |
| 2021/0398319 | A1* | 12/2021 | Hsiao | G06T 7/80 |
| 2022/0326336 | A1* | 10/2022 | Narendra | G01S 5/163 |
| 2025/0111522 | A1* | 4/2025 | Wong | G06T 7/80 |
| 2025/0159480 | A1* | 5/2025 | Ke | H04W 76/11 |

FOREIGN PATENT DOCUMENTS

| | | |
|---|---|---|
| TW | I735830 B | 8/2021 |
| TW | 202321775 A* | 6/2023 |

* cited by examiner

COORDINATE SYSTEM OFFSET CALCULATING APPARATUS, METHOD, AND NON-TRANSITORY COMPUTER READABLE STORAGE MEDIUM THEREOF

BACKGROUND

Field of Invention

The present invention relates to a coordinate system offset calculating apparatus, method, and non-transitory computer readable storage medium thereof. More particularly, the present invention relates to a coordinate system offset calculating apparatus, method, and non-transitory computer readable storage medium thereof for calculating a coordinate system offset of different coordinate systems.

Description of Related Art

In recent years, various technologies related to virtual reality have developed rapidly, and various technologies and applications have been proposed one after another.

In the prior art, a user can assist the interactive device (e.g., a head-mounted device) to perform various interactive operations through the tracking apparatus in the environment.

However, since each of the interactive device and the tracking apparatus may be positioned through a variety of positioning methods (e.g., vision-based inside-out positioning or infrared-based outside-in positioning, etc.) and may have different initial positioning conditions, different devices have different coordinate systems (e.g., different original points, displacement, angle, etc.).

Accordingly, if there is no offset calibration for the coordinate systems between the devices, the auxiliary data generated by the tracking apparatus may not be correctly provided to the interactive device for use, thus reducing the user's service experience.

Accordingly, there is an urgent need for a coordinate system offset calculating technology that can calculate a coordinate system offset of different coordinate systems.

SUMMARY

An objective of the present disclosure is to provide a coordinate system offset calculating apparatus. The coordinate system offset calculating apparatus comprises a transceiver interface and a processor, and the processor is electrically connected to the transceiver interface. The processor generates at least two virtual calibration coordinates, wherein the at least two virtual calibration coordinates correspond to a first coordinate system. The processor receives at least two sensing coordinates from a tracking apparatus in response to the tracking apparatus moving to the at least two virtual calibration coordinates, wherein the at least two sensing coordinates are generated by the tracking apparatus, and the at least two sensing coordinates correspond to a second coordinate system. The processor calculates a coordinate system offset corresponding to the first coordinate system and the second coordinate system based on the at least two virtual calibration coordinates and the at least two sensing coordinates.

Another objective of the present disclosure is to provide a coordinate system offset calculating method, which is adapted for use in an electronic apparatus. The coordinate system offset calculating method comprises the following steps: generating at least two virtual calibration coordinates, wherein the at least two virtual calibration coordinates correspond to a first coordinate system; receiving at least two sensing coordinates from a tracking apparatus in response to the tracking apparatus moving to the at least two virtual calibration coordinates, wherein the at least two sensing coordinates are generated by the tracking apparatus, and the at least two sensing coordinates correspond to a second coordinate system; and calculating a coordinate system offset corresponding to the first coordinate system and the second coordinate system based on the at least two virtual calibration coordinates and the at least two sensing coordinates.

A further objective of the present disclosure is to provide a non-transitory computer readable storage medium having a computer program stored therein. The computer program comprises a plurality of codes, the computer program executes a coordinate system offset calculating method after being loaded into an electronic apparatus. The coordinate system offset calculating method comprises the following steps: generating at least two virtual calibration coordinates, wherein the at least two virtual calibration coordinates correspond to a first coordinate system; receiving at least two sensing coordinates from a tracking apparatus in response to the tracking apparatus moving to the at least two virtual calibration coordinates, wherein the at least two sensing coordinates are generated by the tracking apparatus, and the at least two sensing coordinates correspond to a second coordinate system; and calculating a coordinate system offset corresponding to the first coordinate system and the second coordinate system based on the at least two virtual calibration coordinates and the at least two sensing coordinates.

According to the above descriptions, the coordinate system offset calculating technology (at least including the apparatus, the method, and the non-transitory computer readable storage medium) provided by the present disclosure calculates the coordinate system offset corresponding to the first coordinate system and the second coordinate system through at least two virtual calibration coordinates and at least two sensing coordinates generated by the tracking apparatus. Since the coordinate system offset calculating technology provided by the present disclosure can calculate the coordinate system offset of different coordinate systems, it improves the accuracy of interaction device and improves the user's service experience.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a coordinate system offset calculating apparatus, method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
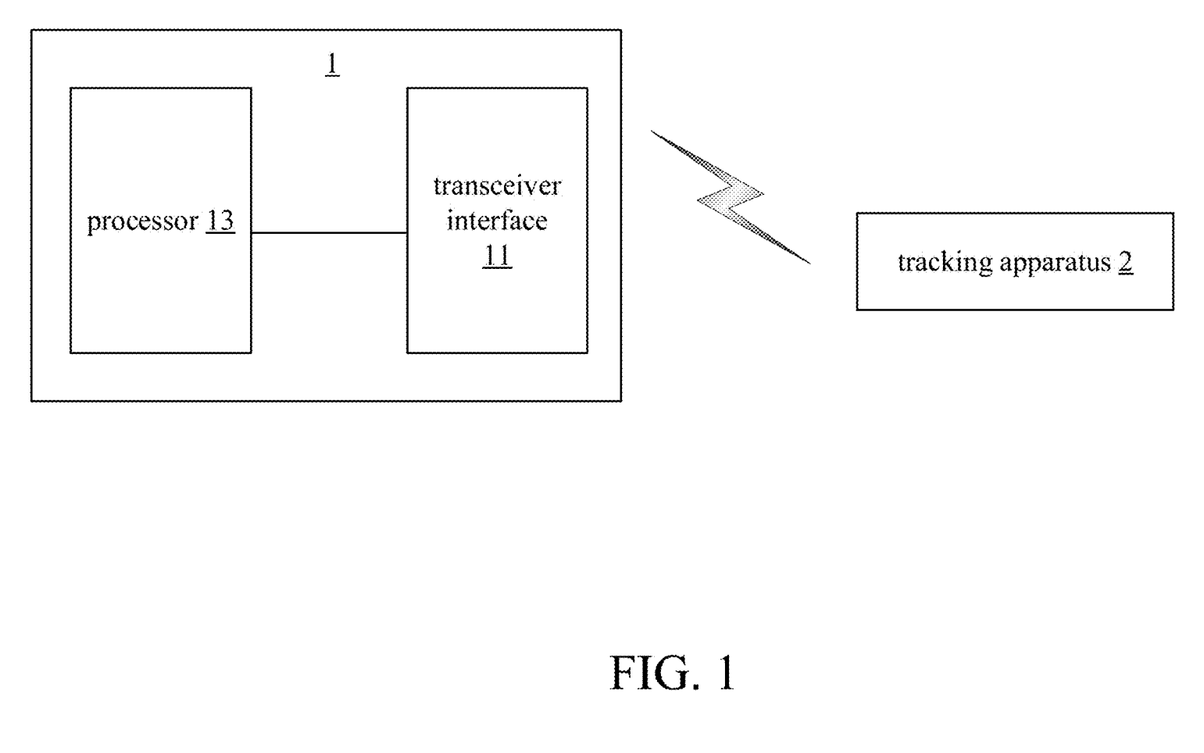
FIG. 1 is a schematic view depicting a coordinate system offset calculating apparatus of the first embodiment.

A first embodiment of the present disclosure is a coordinate system offset calculating apparatus 1 and a schematic view of which is depicted in FIG. 1. In the present embodiment, the coordinate system offset calculating apparatus 1 comprises a transceiver interface 11 and a processor 13, wherein the processor 13 is electrically connected to the transceiver interface 11.

It shall be appreciated that the processor 13 may be any of various processors, Central Processing Units (CPUs), microprocessors, digital signal processors or other coordinate system offset calculating apparatuses known to those of ordinary skill in the art. The transceiver interface 11 is an interface capable of receiving and transmitting data or other interfaces capable of receiving and transmitting data and known to those of ordinary skill in the art.

As shown in FIG. 1, the transceiver interface 11 can be directly connected to the tracking apparatus 2 through communication. In some embodiments, the transceiver interface 11 of the coordinate system offset calculating apparatus 1 can be connected to the tracking apparatus 2 through communication with other devices.

In some embodiments, the tracking apparatus 2 may have an image capturing function (e.g., a plurality of depth camera lenses) to generate a plurality of real-time images corresponding to a field of view (FOV) to perform a self-positioning operation of inside-out tracking.

In some embodiments, the tracking apparatus 2 may also perform a self-positioning operation of outside-in tracking through externally transmitted auxiliary data. For example, the tracking apparatus 2 may be assisted in positioning through an infrared device installed in the environment.

Figure 2:
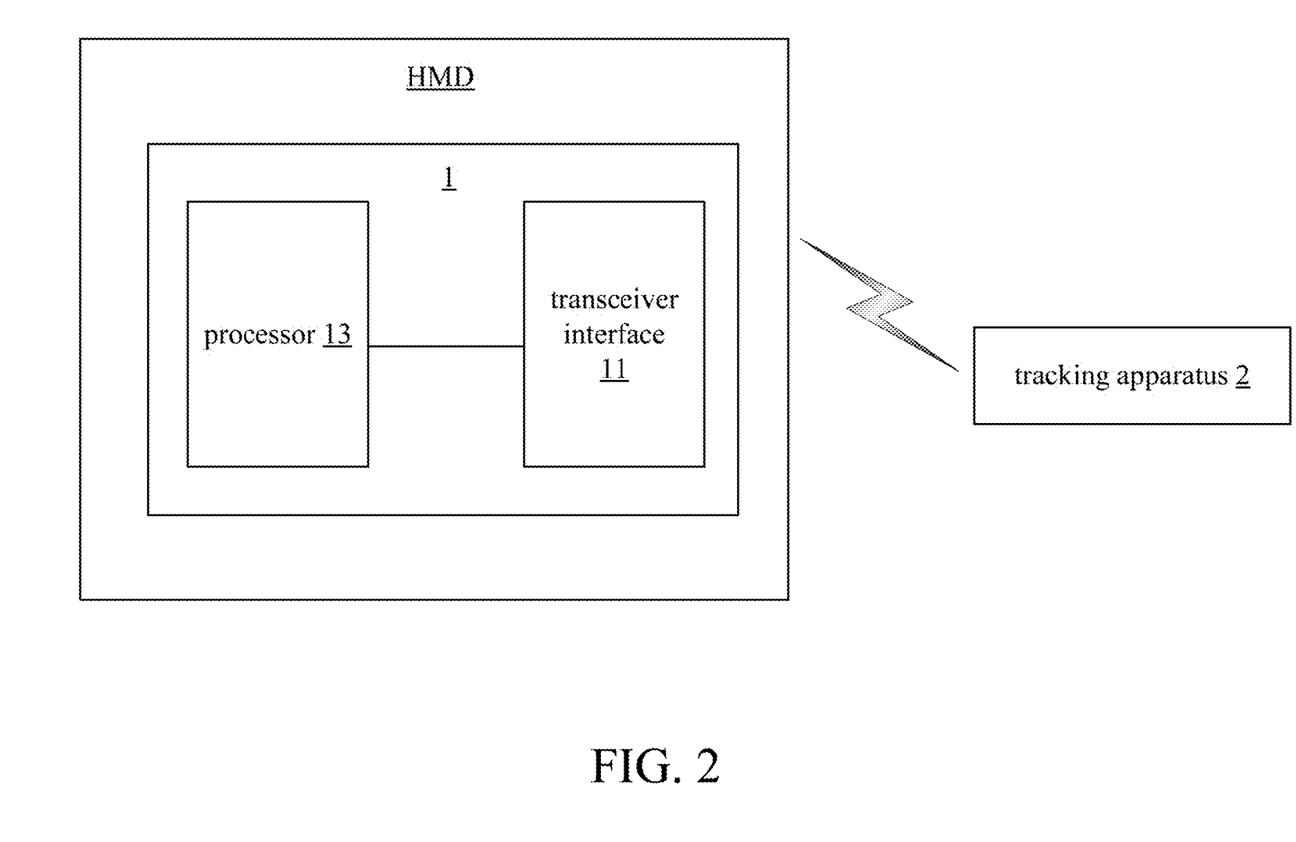
FIG. 2 is a schematic view depicting a coordinate system offset calculating apparatus of some embodiment.

In some embodiments, the coordinate system offset calculating apparatus 1 may be installed in other devices or combined with a device having computing capabilities (e.g., using processor 13 with the device). For example, as shown in FIG. 2, the coordinate system offset calculating apparatus 1 may be installed in the head-mounted device HMD, the processor 13 may be a built-in processor in the head-mounted device HMD, and the transceiver interface 11 may be a built-in transceiver interface in the head-mounted device HMD.

It shall be appreciated that in the present disclosure, since the tracking apparatus 2 and the head-mounted device HMD have been aligned in one of the directional dimensions (e.g., the vertical directional dimension), only the values of the other two directional dimensions need to be considered, which can further improve the efficiency of calculating coordinate system offsets. The details of the coordinate system offset calculation will be detailed later.

For example, the tracking apparatus 2 and the head-mounted device HMD comprise an inertial sensor with a gravity sensor. The tracking apparatus 2 and the head-mounted device HMD generate one of the coordinate values through the gravity sensor (i.e., the direction of gravity is −G). For another example, the tracking apparatus 2 and the head-mounted device HMD may also be aligned in one of the direction dimensions (e.g., both of the vertical directional dimensions are −G) through tracking pose data of simultaneous localization and mapping (SLAM).

For ease of understanding, the following will describe the situation in which the coordinate system offset calculating apparatus 1 is installed in the head-mounted device HMD. Those with ordinary knowledge in the art should be able to understand other implementations of the coordinate system offset calculating apparatus 1 based on the descriptions of the present disclosure, so no further details are given here.

First, the operations of the present disclosure will be briefly described. In the present disclosure, the coordinate system offset calculating apparatus 1 uses the coordinate system corresponding to the head-mounted device HMD (hereinafter referred to as: the first coordinate system), and the tracking apparatus 2 uses the coordinate system corresponding to the tracking apparatus 2 (hereinafter referred to as: the second coordinate system). The coordinate system offset calculating apparatus 1 of the present disclosure generates virtual calibration coordinates and instructs user to move the tracking apparatus 2 to the virtual calibration coordinates. Then, the coordinate system offset calculating apparatus 1 obtains the actual sensing coordinates generated by the tracking apparatus 2 to calculate a coordinate system offset corresponding to the first coordinate system and the second coordinate system.

It shall be appreciated that between different coordinate systems, there are displacement differences, angle differences and scale differences. In the present embodiment, the coordinate system offset calculating apparatus 1 may generate a plurality of virtual calibration coordinates (i.e., at least two virtual calibration coordinates) to calculate the coordinate system offset.

For the convenience of explanation, the following description will be given using two virtual calibration coordinates generated by the coordinate system offset calculating apparatus 1 (i.e., the first virtual calibration coordinate and the second virtual calibration coordinate). Those with ordinary knowledge in the art should be able to understand implementations of more than two virtual calibration coordinates based on the descriptions of the present disclosure, so no further details are given here.

Figure 3:
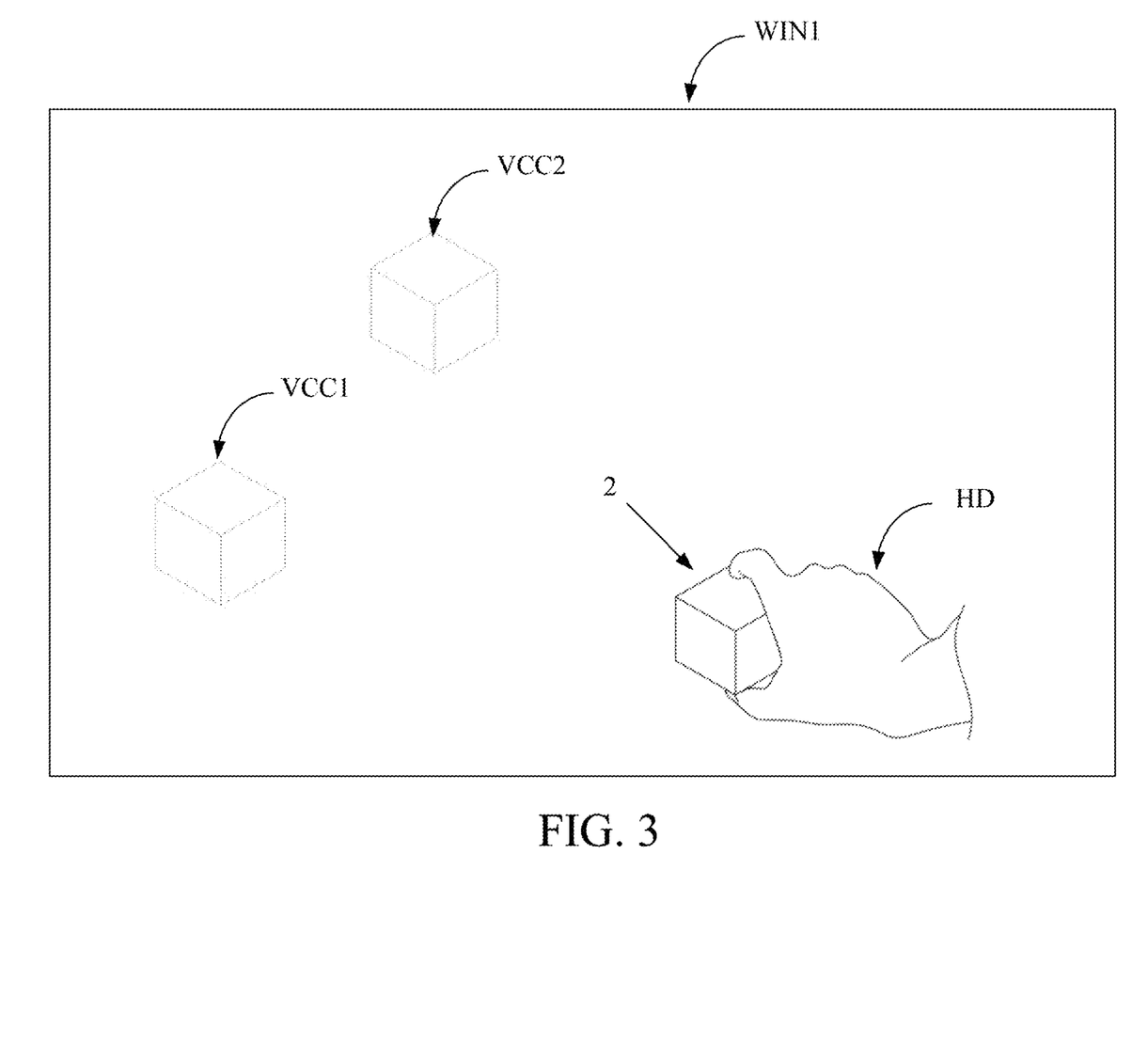
FIG. 3 is a schematic view depicting an image window of some embodiments.

For ease of understanding, please refer to FIG. 3. First, the processor 13 generates a first virtual calibration coordinate VCC1 and a second virtual calibration coordinate VCC2. The first virtual calibration coordinate VCC1 and the second virtual calibration coordinate VCC2 correspond to the first coordinate system of the head-mounted device HMD.

As shown in FIG. 3, in the image window WIN1 of the head-mounted device HMD, the virtual images corresponding to the tracking apparatus 2 are respectively displayed at the positions of the first virtual calibration coordinate VCC1 and the second virtual calibration coordinate VCC2. In the present example, the hand HD of the user using the head-mounted device HMD holds the tracking apparatus 2 and prepares to move the tracking apparatus 2 to the positions of the first virtual calibration coordinate VCC1 and the second virtual calibration coordinate VCC2.

It shall be appreciated that the head-mounted device HMD may be a VR/MR/AR head-mounted device HMD, and the head-mounted device HMD can allow the user to see the hand HD through an optical see-through operation or a video see-through operation.

Figure 4:
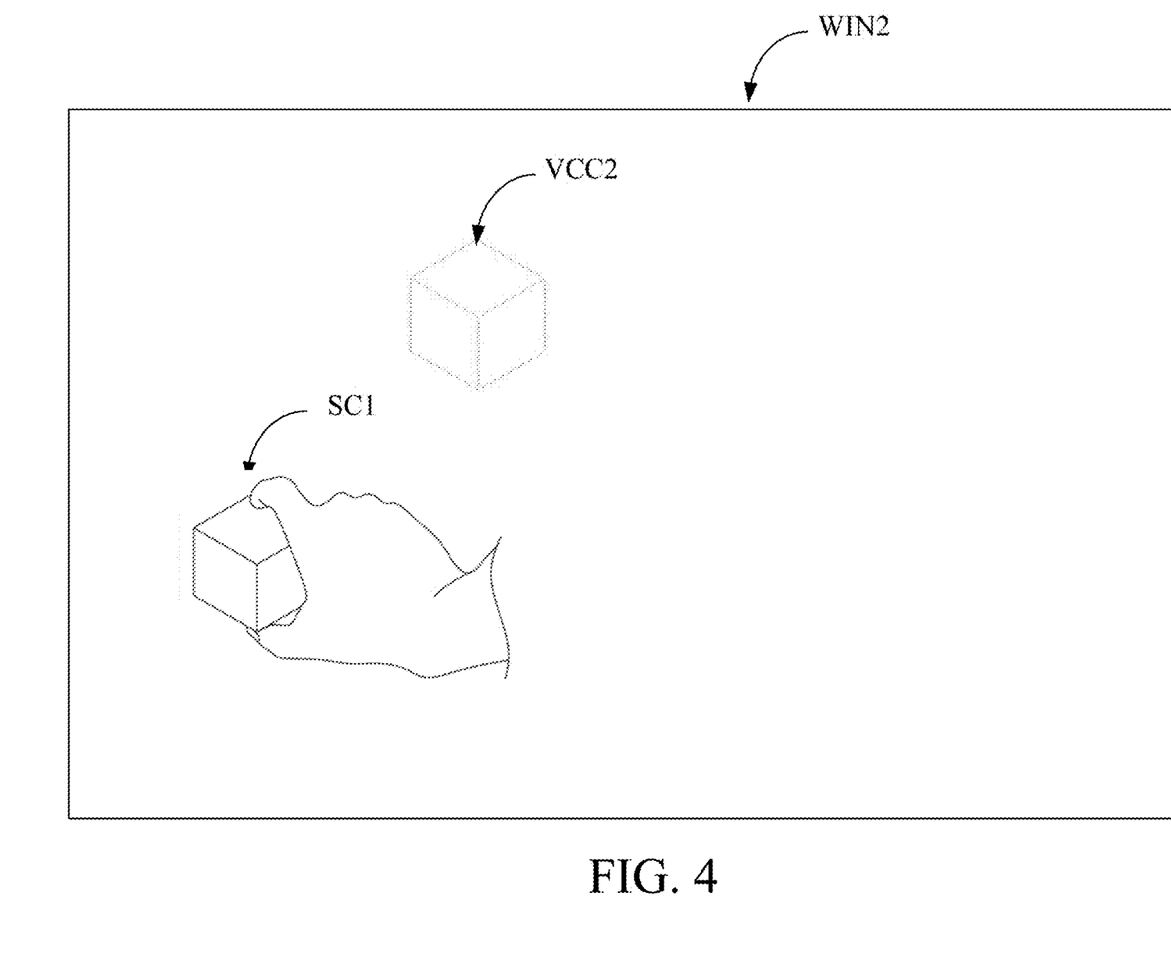
FIG. 4 is a schematic view depicting an image window of some embodiments.

Next, as shown in FIG. 4, in the image window WIN2 of the head-mounted device HMD, the processor 13 determines whether the tracking apparatus 2 has moved to the first virtual calibration coordinate VCC1 (e.g., the tracking apparatus 2 is overlapped with the virtual image). In response to the processor 13 determining that the tracking apparatus 2 has moved to the first virtual calibration coordinate VCC1, the processor 13 receives/records/stores the first sensing coordinate SC1 corresponding to the first virtual calibration coordinate VCC1 from the tracking apparatus 2 (i.e., the actual coordinates sensed by the tracking apparatus 2 at this location).

It shall be appreciated that the processor 13 may continuously receive pose data from the tracking apparatus 2. When the processor 13 determines a time point that the tracking apparatus 2 moves to the first virtual calibration coordinate VCC1, the processor 13 records/stores the pose data (i.e., including the first sensing coordinate SC1 corresponding to the first virtual calibration coordinate VCC1) at the time point.

Figure 5:
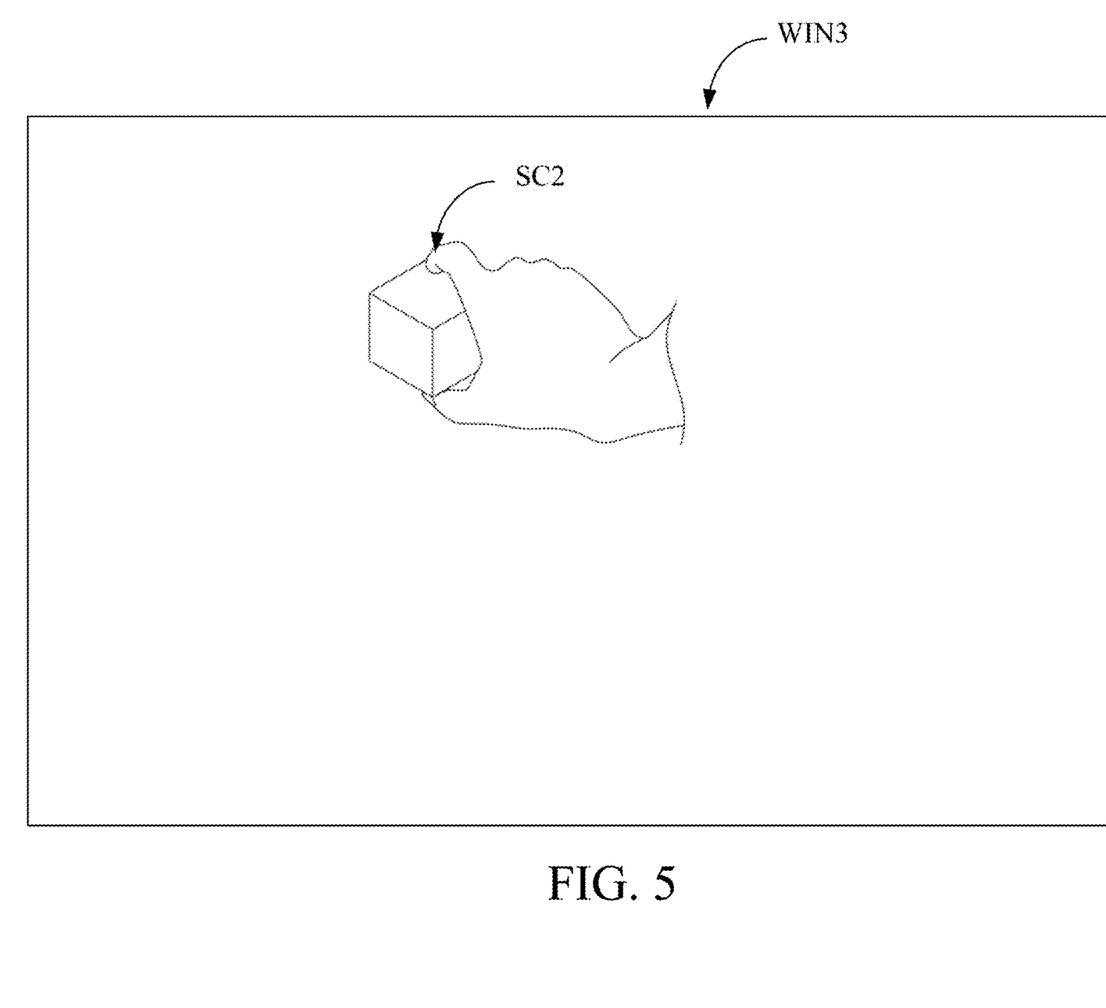
FIG. 5 is a schematic view depicting an image window of some embodiments.

In addition, as shown in FIG. 5, in the image window WIN3 of the head-mounted device HMD, the processor 13 determines whether the tracking apparatus 2 has moved to the second virtual calibration coordinate VCC2. In response to the processor 13 determining that the tracking apparatus 2 has moved to the second virtual calibration coordinate VCC2, the processor 13 receives/records/stores the second sensing coordinate SC2 corresponding to the second virtual calibration coordinate VCC2 from the tracking apparatus 2 (i.e., the actual coordinates sensed by the tracking apparatus 2 at this location).

It shall be appreciated that the processor 13 may determine that the tracking apparatus 2 has moved to the virtual calibration coordinates through different preset methods. For example, in some embodiments, the processor 13 may determine that the tracking apparatus 2 has moved to the virtual calibration coordinates through images captured by the head-mounted device HMD. For another example, the processor 13 may determine that the tracking apparatus 2 has moved to the virtual calibration coordinates by determining that the tracking apparatus 2 has stopped returning movement information.

In some embodiments, a button can be further provided on the tracking apparatus 2. After the user moves the position of the tracking apparatus 2, the user touches the button to send a notification signal to the coordinate system offset calculating apparatus 1 to notify the coordinate system offset calculating apparatus 1 that the movement operation is completed.

It shall be appreciated that in the present example, since positioning is performed through at least two specific positions (i.e., virtual calibration coordinates), the processor 13 does not need to perform orientation positioning on the tracking apparatus 2 (i.e., it is not necessary to align the facing direction of the tracking apparatus 2) when determining whether to move to the virtual calibration coordinates (i.e., the alignment operation), but only needs to determine whether the positions of the tracking apparatus 2 have overlapped.

It shall be appreciated that the coordinate system offset calculating apparatus 1 may use a plurality of virtual calibration coordinates to perform offset calculation operations, the tracking apparatus 2 may generate a plurality of corresponding sensing coordinates, and each of the virtual calibration coordinates corresponds to one of the sensing coordinates. Taking the number of virtual calibration coordinates as 2 as an example, the virtual calibration coordinates comprise a first virtual calibration coordinate and a second virtual calibration coordinate, the sensing coordinates comprise a first sensing coordinate and a second sensing coordinate, the first virtual calibration coordinate corresponds to the first sensing coordinate, and the second virtual calibration coordinate corresponds to the second sensing coordinate.

It shall be appreciated that FIG. 3 is only an example. The actual operations can be carried out according to different virtual calibration coordinate movement sequences without affecting the results of the operations.

In some embodiments, the processor 13 determines whether the tracking apparatus 2 has moved to the first virtual calibration coordinate VCC1 and the second virtual calibration coordinate VCC2. When the processor 13 determines that the tracking apparatus 2 has moved to the first virtual calibration coordinate VCC1 and the second virtual calibration coordinate VCC2, the processor 13 receives/records/stores the first sensing coordinate SC1 and the second sensing coordinate SC2 corresponding to the first virtual calibration coordinate VCC1 and the second virtual calibration coordinate VCC2 from the tracking apparatus 2. The first sensing coordinate SC1 and the second sensing coordinate SC2 are generated by the tracking apparatus 2, and the first sensing coordinate SC1 and the second sensing coordinate SC2 correspond to a second coordinate system.

Next, in the present embodiment, the processor 13 calculates a coordinate system offset corresponding to the first coordinate system and the second coordinate system based on the virtual calibration coordinates (i.e., the first virtual calibration coordinates VCC1 and the second virtual calibration coordinates VCC2) and the sensing coordinates (i.e., the first sensing coordinate SC1 and the second sensing coordinate SC2).

In some embodiments, the coordinate system offset calculated by the processor 13 comprises a displacement difference and an angle difference. Specifically, the processor 13 calculates a displacement difference and an angle difference based on the virtual calibration coordinates and the sensing coordinates. Next, the processor 13 calculates the coordinate system offset based on the displacement difference (i.e., movement value) and the angle difference (i.e., rotation value).

In some embodiments, the coordinate system offset can be represented by a transformation matrix to perform a transformation operation. The processor 13 can transform the coordinate values from the second coordinate system to the first coordinate system through the transformation matrix.

In some embodiments, the processor 13 calculates a first-dimensional displacement difference, a second-dimensional displacement difference, and a third-dimensional displacement difference corresponding to a three-dimensional space based on the first virtual calibration coordinate VCC1 and the first sensing coordinate SC1. Next, the processor 13 calculates the displacement difference based on the first-dimensional displacement difference, the second-dimensional displacement difference, and the third-dimensional displacement difference.

In some embodiments, the processor 13 calculates a vector angle difference between a virtual calibration vector and a sensing vector in a two-dimensional space, wherein the virtual calibration vector is composed of the first virtual calibration coordinate VCC1 and the second virtual calibration coordinate VCC2, and the sensing vector is composed of the first sensing coordinate SC1 and the second sensing coordinate SC2. Next, the processor 13 calculates the angle difference based on the vector angle difference.

It shall be appreciated that since the tracking apparatus 2 and the head-mounted device HMD have been aligned in one of the directional dimensions (e.g., the vertical directional dimension), only the values of the other two directional dimensions need to be considered.

For example, since both the tracking apparatus 2 and the head-mounted device HMD have gravity sensors, the directions with respect to the vertical dimension (e.g., the gravity dimension in the third dimension) in the coordinate systems they generate are the same (i.e., both of the direction of gravity are −G). In other words, the third dimensional direction corresponding to the first coordinate system is the same as the third dimensional direction corresponding to the second coordinate system. Therefore, when calculating the angle difference, the processor 13 only needs to consider the values of the other two direction dimensions.

Figure 6:
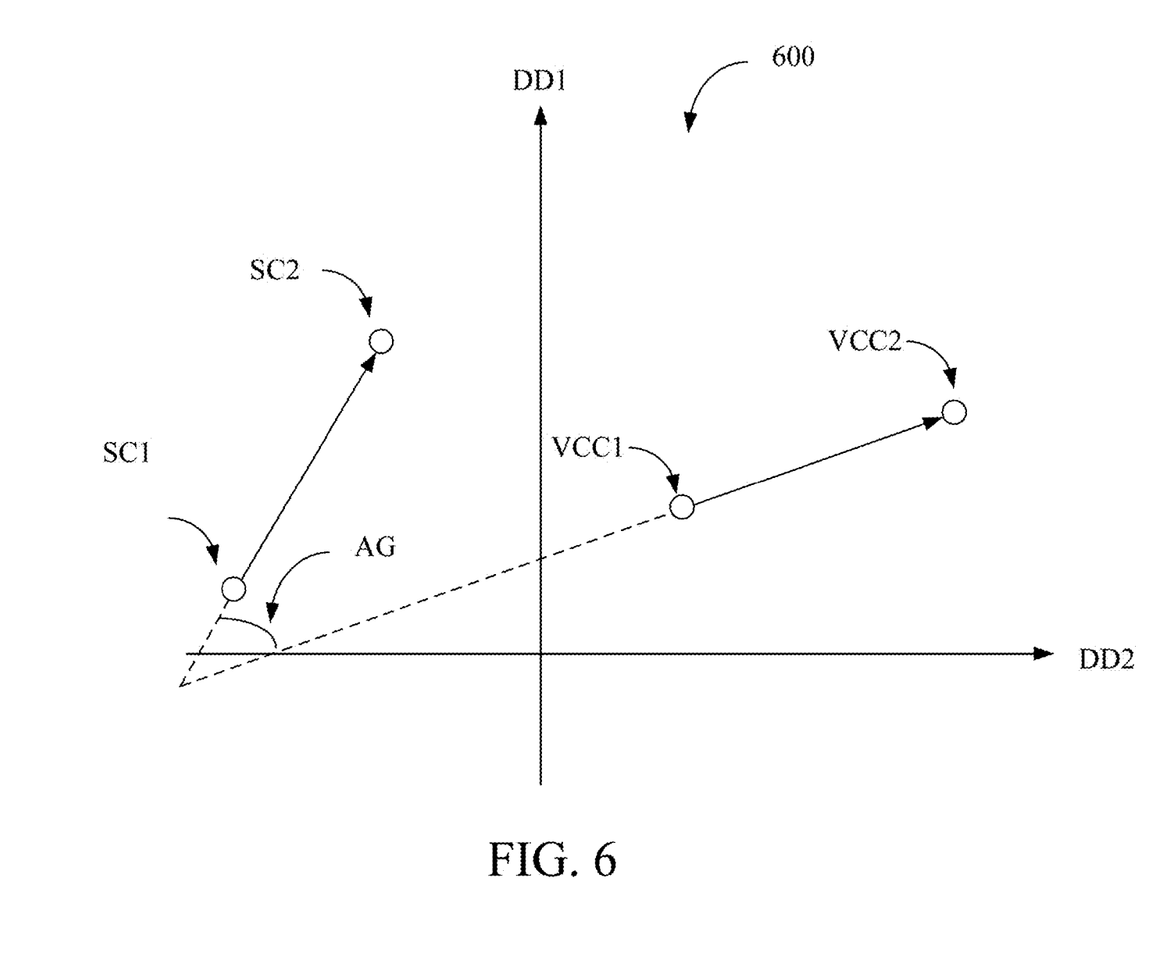
FIG. 6 is a schematic view depicting the top view of corresponding coordinates of some embodiments.

For ease of understanding, please refer to the schematic view 600 depicting the top view of corresponding coordinates in FIG. 6. The schematic view 600 is a top view in a three-dimensional space (i.e., the vertical dimension is not considered), the Y-axis is the direction dimension DD1, and the X-axis is the direction dimension DD2.

As shown in FIG. 6, the schematic view 600 shows the actual positions of the first virtual calibration coordinate VCC1 and the second virtual calibration coordinate VCC2 in the space and the actual positions of the first sensing coordinate SC1 and the second sensing coordinate SC2 in the space. It shall be appreciated that the schematic view 600 is only a top view without losing the information on the vertical dimension. The first virtual calibration coordinate VCC1, the second virtual calibration coordinate VCC2, the first sensing coordinate SC1, and the second sensing coordinate SC2 are still coordinate values in a three-dimensional space.

In the present example, the processor 13 may calculate the displacement difference between the first virtual calibration coordinate VCC1 and the first sensing coordinate SC1 in the X dimension (i.e., the direction dimension DD2), the Y dimension (i.e., the direction dimension DD1), and the Z dimension (i.e., the vertical direction dimension) based on the coordinate difference between the first virtual calibration coordinate VCC1 and the first sensing coordinate SC1 in the three-dimensional space.

In addition, in the present example, the processor 13 may calculate the angle value that needs to be rotated (i.e., the angle difference) based on the vector angle difference AG of the virtual calibration vector (i.e., composed of the first virtual calibration coordinate VCC1 and the second virtual calibration coordinate VCC2) and the sensing vector (i.e., composed of the first sensing coordinate SC1 and the second sensing coordinate SC2).

In some embodiments, since the scales used by the two coordinate systems may be different (e.g., using different calculation units), the processor 13 may further calculate the offset of the scale difference. Specifically, the processor 13 calculates a vector length difference between a virtual calibration vector and a sensing vector, wherein the virtual calibration vector is composed of the first virtual calibration coordinate and the second virtual calibration coordinate, and the sensing vector is composed of the first sensing coordinate and the second sensing coordinate. Next, the processor 13 calculates the scale difference based on the vector length difference.

In some embodiments, the processor 13 calculates a scale difference based on the at least two virtual calibration coordinates and the at least two sensing coordinates. Next, the processor 13 calculates the coordinate system offset based on the displacement difference, the angle difference, and the scale difference.

In some embodiments, the sensing coordinates are generated by the tracking apparatus 2 based on a plurality of positioning information. For example, the sensing coordinates can be generated by the tracking apparatus 2 based on the positioning information of a plurality of real-time images (e.g., the operation of simultaneous localization and mapping (SLAM)). For another example, the sensing coordinates may be generated by the tracking apparatus 2 based on positioning information (e.g., the lighthouse positioning technology provided by HTC) received from an external device (e.g., an infrared device).

According to the above descriptions, the coordinate system offset calculating apparatus 1 provided by the present disclosure calculates the coordinate system offset corresponding to the first coordinate system and the second coordinate system through at least two virtual calibration coordinates and at least two sensing coordinates generated by the tracking apparatus. Since the coordinate system offset calculating apparatus 1 provided by the present disclosure can calculate the coordinate system offset of different coordinate systems, it improves the accuracy of interaction device and improves the user's service experience.

Figure 7:
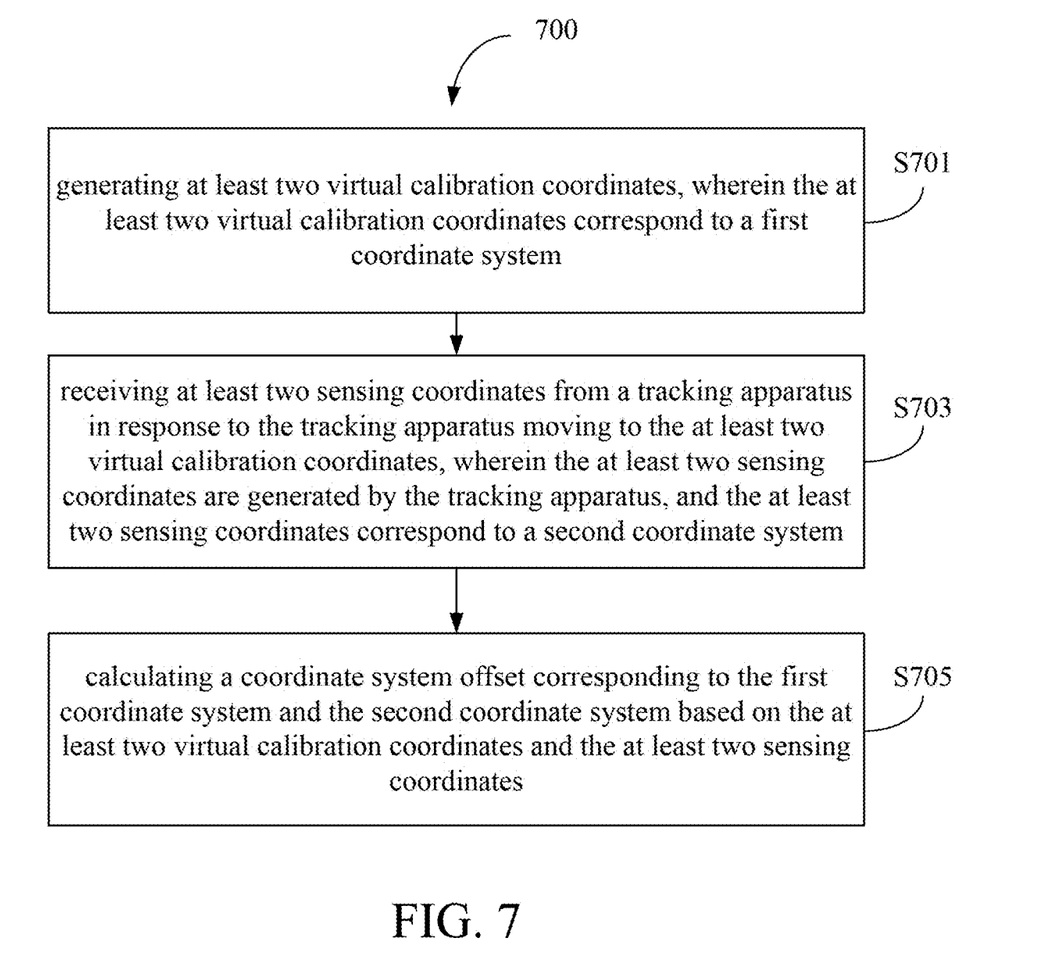
FIG. 7 is a partial flowchart depicting a coordinate system offset calculating method of the second embodiment.

A second embodiment of the present disclosure is a coordinate system offset calculating method and a flowchart thereof is depicted in FIG. 7. The coordinate system offset calculating method 700 is adapted for an electronic apparatus (e.g., the coordinate system offset calculating apparatus 1 of the first embodiment). The coordinate system offset calculating method 700 calculates a coordinate system offset through the steps S701 to S705.

In the step S701, the electronic apparatus generates at least two virtual calibration coordinates, wherein the at least two virtual calibration coordinates correspond to a first coordinate system.

Next, in the step S703, the electronic apparatus receives at least two sensing coordinates from a tracking apparatus in response to the tracking apparatus moving to the at least two virtual calibration coordinates, wherein the at least two sensing coordinates are generated by the tracking apparatus, and the at least two sensing coordinates correspond to a second coordinate system.

Finally, in the step S705, the electronic apparatus calculates a coordinate system offset corresponding to the first coordinate system and the second coordinate system based on the at least two virtual calibration coordinates and the at least two sensing coordinates.

In some embodiments, the coordinate system offset calculating method 700 further comprises the following steps: in response to determining the tracking apparatus moves to a first virtual calibration coordinate among the at least two virtual calibration coordinates, receiving/recording/storing a first sensing coordinate corresponding to the first virtual calibration coordinate from the tracking apparatus; and in response to determining the tracking apparatus moves to a second virtual calibration coordinate among the at least two virtual calibration coordinates, receiving/recording/storing a second sensing coordinate corresponding to the second virtual calibration coordinate from the tracking apparatus.

In some embodiments, wherein a third dimensional direction corresponding to the first coordinate system is the same as the third dimensional direction corresponding to the second coordinate system.

In some embodiments, wherein the step of calculating the coordinate system offset further comprises the following steps: calculating a displacement difference and an angle difference based on the at least two virtual calibration coordinates and the at least two sensing coordinates; and calculating the coordinate system offset based on the displacement difference and the angle difference.

In some embodiments, wherein the at least two virtual calibration coordinates comprise a first virtual calibration coordinate and a second virtual calibration coordinate, the at least two sensing coordinates comprise a first sensing coordinate and a second sensing coordinate, the first virtual calibration coordinate corresponds to the first sensing coordinate, and the second virtual calibration coordinate corresponds to the second sensing coordinate.

In some embodiments, wherein the step of calculating the displacement difference further comprises the following steps: calculating a first-dimensional displacement difference, a second-dimensional displacement difference, and a third-dimensional displacement difference corresponding to a three-dimensional space based on the first virtual calibration coordinate and the first sensing coordinate; and calculating the displacement difference based on the first-dimensional displacement difference, the second-dimensional displacement difference, and the third-dimensional displacement difference.

In some embodiments, wherein the step of calculating the angle difference further comprises the following steps: calculating a vector angle difference between a virtual calibration vector and a sensing vector in a two-dimensional space, wherein the virtual calibration vector is composed of the first virtual calibration coordinate and the second virtual calibration coordinate, and the sensing vector is composed of the first sensing coordinate and the second sensing coordinate; and calculating the angle difference based on the vector angle difference.

In some embodiments, wherein the step of calculating the coordinate system offset further comprises the following steps: calculating a scale difference based on the at least two virtual calibration coordinates and the at least two sensing coordinates; and calculating the coordinate system offset based on the displacement difference, the angle difference, and the scale difference.

In some embodiments, wherein the step of calculating the scale difference further comprises the following steps: calculating a vector length difference between a virtual calibration vector and a sensing vector, wherein the virtual calibration vector is composed of the first virtual calibration coordinate and the second virtual calibration coordinate, and the sensing vector is composed of the first sensing coordinate and the second sensing coordinate; and calculating the scale difference based on the vector length difference.

In addition to the aforesaid steps, the second embodiment can also execute all the operations and steps of the coordinate system offset calculating apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The coordinate system offset calculating method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the coordinate system offset calculating apparatus 1), the computer program executes the coordinate system offset calculating method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the virtual calibration coordinate, the sensing coordinate, the coordinate system, etc.) are preceded by terms such as "first", or "second", and these terms of "first", or "second" are only used to distinguish these different words. For example, the "first" and "second" coordinate system are only used to indicate the coordinate system used in different operations.

According to the above descriptions, the coordinate system offset calculating technology (at least including the apparatus, the method, and the non-transitory computer readable storage medium) provided by the present disclosure calculates the coordinate system offset corresponding to the first coordinate system and the second coordinate system through at least two virtual calibration coordinates and at least two sensing coordinates generated by the tracking apparatus. Since the coordinate system offset calculating technology provided by the present disclosure can calculate the coordinate system offset of different coordinate systems, it improves the accuracy of interaction device and improves the user's service experience.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A coordinate system offset calculating apparatus, comprising:
    a transceiver interface; and a processor, being electrically connected to the transceiver interface, and being configured to perform operations comprising:
  displaying two virtual images respectively at positions of two virtual calibration coordinates, wherein the two virtual calibration coordinates correspond to a first coordinate system of the coordinate system offset calculating apparatus;
  receiving two sensing coordinates from a tracking apparatus in response to the tracking apparatus moving to the two virtual calibration coordinates, wherein the two sensing coordinates are generated by the tracking apparatus, and the two sensing coordinates correspond to a second coordinate system;
  calculating a coordinate system offset corresponding to the first coordinate system and the second coordinate system based on the two virtual calibration coordinates and the two sensing coordinates; and
  performing an offset calibration operation, based on the coordinate system offset, between the first coordinate system of the coordinate system offset calculating device and the second coordinate system of the tracking apparatus.

2. The coordinate system offset calculating apparatus of claim 1, wherein the processor is further configured to perform the following operations:
  in response to determining the tracking apparatus moves to a first virtual calibration coordinate among the two virtual calibration coordinates, receiving a first sensing coordinate corresponding to the first virtual calibration coordinate from the tracking apparatus; and
  in response to determining the tracking apparatus moves to a second virtual calibration coordinate among the two virtual calibration coordinates, receiving a second sensing coordinate corresponding to the second virtual calibration coordinate from the tracking apparatus.

3. The coordinate system offset calculating apparatus of claim 1, wherein a third dimensional direction corresponding to the first coordinate system is the same as the third dimensional direction corresponding to the second coordinate system.

4. The coordinate system offset calculating apparatus of claim 1, wherein the operation of calculating the coordinate system offset further comprises the following operations:
  calculating a displacement difference and an angle difference based on the two virtual calibration coordinates and the two sensing coordinates; and
  calculating the coordinate system offset based on the displacement difference and the angle difference.

5. The coordinate system offset calculating apparatus of claim 4, wherein the two virtual calibration coordinates comprise a first virtual calibration coordinate and a second virtual calibration coordinate, the two sensing coordinates comprise a first sensing coordinate and a second sensing coordinate, the first virtual calibration coordinate corresponds to the first sensing coordinate, and the second virtual calibration coordinate corresponds to the second sensing coordinate.

6. The coordinate system offset calculating apparatus of claim 5, wherein the operation of calculating the displacement difference further comprises the following operations:
  calculating a first-dimensional displacement difference, a second-dimensional displacement difference, and a third-dimensional displacement difference corresponding to a three-dimensional space based on the first virtual calibration coordinate and the first sensing coordinate; and
  calculating the displacement difference based on the first-dimensional displacement difference, the second-dimensional displacement difference, and the third-dimensional displacement difference.

7. The coordinate system offset calculating apparatus of claim 5, wherein the operation of calculating the angle difference further comprises the following operations:
  calculating a vector angle difference between a virtual calibration vector and a sensing vector in a two-dimensional space, wherein the virtual calibration vector is composed of the first virtual calibration coordinate and the second virtual calibration coordinate, and the sensing vector is composed of the first sensing coordinate and the second sensing coordinate; and
  calculating the angle difference based on the vector angle difference.

8. The coordinate system offset calculating apparatus of claim 5, wherein the operation of calculating the coordinate system offset further comprises the following operations:
  calculating a scale difference based on the two virtual calibration coordinates and the two sensing coordinates; and
  calculating the coordinate system offset based on the displacement difference, the angle difference, and the scale difference.

9. The coordinate system offset calculating apparatus of claim 8, wherein the operation of calculating the scale difference further comprises the following operations:
  calculating a vector length difference between a virtual calibration vector and a sensing vector, wherein the virtual calibration vector is composed of the first virtual calibration coordinate and the second virtual calibration coordinate, and the sensing vector is composed of the first sensing coordinate and the second sensing coordinate; and
  calculating the scale difference based on the vector length difference.

10. The coordinate system offset calculating apparatus of claim 1, wherein the two sensing coordinates are generated by the tracking apparatus based on a plurality of positioning information.

11. A coordinate system offset calculating method, being adapted for use in an electronic apparatus, and the coordinate system offset calculating method comprises:
  displaying two virtual images respectively at positions two virtual calibration coordinates, wherein the two virtual calibration coordinates correspond to a first coordinate system of the electronic apparatus;
  receiving two sensing coordinates from a tracking apparatus in response to the tracking apparatus moving to the two virtual calibration coordinates, wherein the two sensing coordinates are generated by the tracking apparatus, and the two sensing coordinates correspond to a second coordinate system;
  calculating a coordinate system offset corresponding to the first coordinate system and the second coordinate system based on the two virtual calibration coordinates and the two sensing coordinates; and
  performing an offset calibration operation, based on the coordinate system offset, between the first coordinate system of the electronic apparatus and the second coordinate system of the tracking apparatus.

12. The coordinate system offset calculating method of claim 11, wherein the coordinate system offset calculating method further comprises the following steps:
  in response to determining the tracking apparatus moves to a first virtual calibration coordinate among the two virtual calibration coordinates, receiving a first sensing coordinate corresponding to the first virtual calibration coordinate from the tracking apparatus; and in response to determining the tracking apparatus moves to a second virtual calibration coordinate among the two virtual calibration coordinates, receiving a second sensing coordinate corresponding to the second virtual calibration coordinate from the tracking apparatus.

13. The coordinate system offset calculating method of claim 11, wherein a third dimensional direction corresponding to the first coordinate system is the same as the third dimensional direction corresponding to the second coordinate system.

14. The coordinate system offset calculating method of claim 11, wherein the step of calculating the coordinate system offset further comprises the following steps:

calculating a displacement difference and an angle difference based on the two virtual calibration coordinates and the two sensing coordinates; and calculating the coordinate system offset based on the displacement difference and the angle difference.

15. The coordinate system offset calculating method of claim 14, wherein the two virtual calibration coordinates comprise a first virtual calibration coordinate and a second virtual calibration coordinate, the two sensing coordinates comprise a first sensing coordinate and a second sensing coordinate, the first virtual calibration coordinate corresponds to the first sensing coordinate, and the second virtual calibration coordinate corresponds to the second sensing coordinate.

16. The coordinate system offset calculating method of claim 15, wherein the step of calculating the displacement difference further comprises the following steps:

calculating a first-dimensional displacement difference, a second-dimensional displacement difference, and a third-dimensional displacement difference corresponding to a three-dimensional space based on the first virtual calibration coordinate and the first sensing coordinate; and calculating the displacement difference based on the first-dimensional displacement difference, the second-dimensional displacement difference, and the third-dimensional displacement difference.

17. The coordinate system offset calculating method of claim 15, wherein the step of calculating the angle difference further comprises the following steps:

calculating a vector angle difference between a virtual calibration vector and a sensing vector in a two-dimensional space, wherein the virtual calibration vector is composed of the first virtual calibration coordinate and the second virtual calibration coordinate, and the sensing vector is composed of the first sensing coordinate and the second sensing coordinate; and calculating the angle difference based on the vector angle difference.

18. The coordinate system offset calculating method of claim 15, wherein the step of calculating the coordinate system offset further comprises the following steps:

calculating a scale difference based on the two virtual calibration coordinates and the two sensing coordinates; and calculating the coordinate system offset based on the displacement difference, the angle difference, and the scale difference.

19. The coordinate system offset calculating method of claim 18, wherein the step of calculating the scale difference further comprises the following steps:

calculating a vector length difference between a virtual calibration vector and a sensing vector, wherein the virtual calibration vector is composed of the first virtual calibration coordinate and the second virtual calibration coordinate, and the sensing vector is composed of the first sensing coordinate and the second sensing coordinate; and calculating the scale difference based on the vector length difference.

20. A non-transitory computer readable storage medium, having a computer program stored therein, wherein the computer program comprises a plurality of codes, the computer program executes a coordinate system offset calculating method after being loaded into an electronic apparatus, the coordinate system offset calculating method comprises:

displaying two virtual images respectively at positions of two virtual calibration coordinates, wherein the two virtual calibration coordinates correspond to a first coordinate system of the electronic apparatus;

receiving two sensing coordinates from a tracking apparatus in response to the tracking apparatus moving to the two virtual calibration coordinates, wherein the two sensing coordinates are generated by the tracking apparatus, and the two sensing coordinates correspond to a second coordinate system;

calculating a coordinate system offset corresponding to the first coordinate system and the second coordinate system based on the two virtual calibration coordinates and the two sensing coordinates; and performing an offset calibration operation, based on the coordinate system offset, between the first coordinate system of the electronic apparatus and the second coordinate system of the tracking apparatus.

* * * * *